US012769509B2

(12) United States Patent
Abellán Sánchez et al.

(10) Patent No.: US 12,769,509 B2
(45) Date of Patent: Oct. 20, 2026

(54) COMPUTER-IMPLEMENTED METHOD FOR DECIDING WHETHER A RANDOM NUMBER IS LARGER OR SMALLER THAN A GIVEN THRESHOLD

(71) Applicants: Quside Technologies S.L., Barcelona (ES); Fundació Institut de Ciències Fotòniques, Barcelona (ES)

(72) Inventors: Carlos Abellán Sánchez, Barcelona (ES); José Ramón Martínez Saavedra, Barcelona (ES); Felix Tebbenjohanns, Barcelona (ES)

(73) Assignees: Quside Technologies S.L., Barcelona (ES); Fundació Institut de Ciències Fotòniques, Barcelona (ES)

( * ) Notice: Subject to any disclaimer, the term of this patent is extended or adjusted under 35 U.S.C. 154(b) by 1092 days.

(21) Appl. No.: 17/874,917

(22) Filed: Jul. 27, 2022

(65) Prior Publication Data

US 2022/0365754 A1 Nov. 17, 2022

Related U.S. Application Data

(63) Continuation of application No. PCT/EP2021/052019, filed on Jan. 28, 2021.

(30) Foreign Application Priority Data

Jan. 28, 2020 (EP) .................................... 20382048

(51) Int. Cl.
*G06F 7/02* (2006.01)
*G06F 7/58* (2006.01)

(52) U.S. Cl.
CPC .............. *G06F 7/026* (2013.01); *G06F 7/588* (2013.01)

(58) Field of Classification Search
CPC ...................... G06F 7/02–026; G06F 7/58–588
See application file for complete search history.

(56) References Cited

U.S. PATENT DOCUMENTS 11,853,719 B1 * 12/2023 Ray .......................... G06F 7/58
2003/0023654 A1 * 1/2003 Pascucci ................ G06F 7/026 708/671

(Continued)

FOREIGN PATENT DOCUMENTS

JP H0883167 A * 3/1996

OTHER PUBLICATIONS

Yamashita et al., Mahine Translation of "JP H0883167 A", retrieved from https://worldwide.espacenet.com/patent/search/family/016696885/publication/JPH0883167A?q=pn%3DJPH0883167A (Year: 1996).*

(Continued)

*Primary Examiner* — Carlo Waje
(74) *Attorney, Agent, or Firm* — Edell, Shapiro & Finnan, LLC

(57) ABSTRACT

A method is provided for that includes representing a random number and a threshold as a sequence of bits and comparing the sequence of bits representing the random number with the sequence of bits representing the threshold on a bit-wise basis. The most significant bit of the sequence of bits representing the random number is compared with the most significant sequence of bits representing the threshold. If the bits are not equal, deciding that the random number is larger or smaller than the threshold. If the bits are equal, comparing the immediately following bit in the sequence of bits representing the random number with the immediately following bit in the sequence of bits representing the threshold, and repeating this until the bit of the random number does not equal that of the threshold is reached or until all bits have been compared and found to be equal.

19 Claims, 3 Drawing Sheets

(56) References Cited

U.S. PATENT DOCUMENTS

| | | | | |
|---|---|---|---|---|
| 2004/0225842 | A1 | 11/2004 | Rowlands et al. | |
| 2005/0193045 | A1 * | 9/2005 | Yamamoto | G06F 7/588 708/250 |
| 2013/0028413 | A1 | 1/2013 | Dichtl et al. | |
| 2015/0288520 | A1 | 10/2015 | Jacobson et al. | |
| 2019/0289345 | A1 * | 9/2019 | Najafi | G06F 7/58 |
| 2019/0304410 | A1 * | 10/2019 | Ogaki | G09G 5/391 |
| 2020/0241842 | A1 * | 7/2020 | Cheng | G11C 7/24 |
| 2020/0387563 | A1 * | 12/2020 | Joshi | G06F 17/16 |

OTHER PUBLICATIONS

Search Report in corresponding International Patent Application No. PCT/EP2021/052019, mailed Apr. 8, 2021.

Limire, D., "Fast Random Integer Generation in an Interval", ACM Transactions on Modeling and Computer Simulation, vol. 29, Issue 1, pp. 1-12 (Jan. 2019).

O'Neill, M.E., "Efficiently Generating a Number in a Range", PCG, A Better Random Number Generator, https://www.pcg-random.org/posts/bounded-rands.html, pp. 1-40, (Jul. 2018).

Parker, J.D., "The Period of the Fibonacci Random Number Generator", Discrete applied mathematics, vol. 20(2), pp. 145-164 (1988).

* cited by examiner

COMPUTER-IMPLEMENTED METHOD FOR DECIDING WHETHER A RANDOM NUMBER IS LARGER OR SMALLER THAN A GIVEN THRESHOLD

CROSS-REFERENCE TO RELATED APPLICATION

This is a Continuation of International Application PCT/EP2021/052019, which has an international filing date of Jan. 28, 2021, and the disclosure of which is incorporated in its entirety into the present Continuation by reference. This Continuation also claims foreign priority under 35 U.S.C. § 119(a)-(d) to and also incorporates by reference, in its entirety, European Patent Application EP 20382048.5 filed on Jan. 28, 2020.

FIELD

The present disclosure relates to a computer-implemented method for deciding whether a random number is larger or smaller than a given threshold, as well as a computer-readable storage medium that includes instructions for implementing such a method, and a computing system with a processor, memory, and a comparator configured to implement such a method.

BACKGROUND

Methods for comparing a first number and a second number with each other are commonly known in the prior art. Nowadays systems usually perform subtraction of the second number from the first number in order to determine whether it exceeds the first number (in that case, subtracting it from the first number will yield a negative value) or whether it is smaller than the first number (in that case subtracting it from the first number will yield a positive number). In some contexts, the first number is called a threshold and the second number may be any number that has to be compared to the threshold. In the context of the disclosed techniques, this second number is a random number.

The methods explained above are reliable and provide a definite result and they also provide information on how much the threshold is either exceeded or not exceeded by the given number.

These methods are also useful in the context of comparing random numbers with such thresholds. For numerical simulations like physical simulations, random numbers that exceed or do not exceed a specific threshold are quite important.

Unfortunately, specifically in the context of random numbers, these methods represent a bottleneck as significant computer resources need to be utilized in order to perform the subtractions, especially in the case of long random numbers (considering for example 128-bit resolution methods).

SUMMARY

Thus, one problem that may be addressed by the present disclosure is to provide a computer-implemented method for deciding whether a random number is larger or smaller than a given threshold, with this method being faster and requiring fewer computing resources than traditional methods from the related art.

This problem may be solved by a computer-implemented method according to the techniques disclosed herein, as well as by the computer-readable storage medium that include instructions according to the disclosed techniques, and also by computing system according to the disclosed techniques.

The computer-implemented method for deciding whether a random number is larger or smaller than a given threshold according to the disclosed techniques comprises representing each of the random number and the threshold as a sequence of bits, respectively, and comparing, by a comparator, the sequence of bits representing the random number with the sequence of bits representing the threshold on a bit-wise basis, wherein the comparison starts with comparing the most significant bit of the sequence of bits representing the random number with the most significant sequence of bits representing the threshold and, if the bits are not equal, deciding that the random number is larger or smaller than the threshold and, if the bits are equal, comparing the immediately following bit in the sequence of bits representing the random number with the immediately following bit in the sequence of bits representing the threshold, wherein this comparing is repeated until the first bit that is not equal in the sequence of bits representing the random number and the sequence of bits representing the threshold is reached (found) or until all bits have been compared and found to be equal.

In regard to this disclosure, any system will be referred to as a computing system or computer system or processing system that is adapted to receive an input and provide an output where the input is not identical to the output, thus requiring some kind of processing of the input in order to obtain the output. While, according to the disclosed techniques, also commonly known computers, including also laptops, smartphones and the like, are to be encompassed by the above terms, it is emphasized that the disclosed techniques are not limited in this regard. In fact, the processing device (or synonymously the computer or computing system) does not even need to include a processor or like component. As the disclosed techniques may basically only require some kind of a comparator to be present, no other hardware and/or software entities are intended to be necessarily provided with the processing system.

The disclosed techniques may reduce the decision-making process from the related art to a "simple" yes or no decision in the context of deciding whether a given bit is smaller than, larger than, or equal to another bit. By doing so and by starting with the most significant bit of the random number, the time required to decide or determine whether or not the random number is larger/smaller than the threshold can be reduced significantly as the decision whether or not a random number is larger or smaller than the given threshold can usually be made before having processed all the bits of both the threshold and the random number. In cases where the exact value of how much the random number exceeds the threshold or how much it is below the threshold is of no relevance, this provides the intended result (i.e., the decision) with less computing resources and reduces the computing time required. Thereby the processing of large quantities of random numbers can be improved in both the required time for processing and the required computing resources for processing.

It is noted that for the techniques described above it is not necessary that the random number be already "complete" in that the comparator is provided with the full sequence representing the random number as the comparison is only preformed on the bit-wise basis. Therefore, although the above refers to "a random number", the representation of the random number does not need to be the complete representation of the random number as provided to the comparator because the comparator only performs bit-wise comparison of the random number and the threshold. In the same manner, the threshold does not need to be provided completely (in the sense that the whole sequence of bits would be provided) to the comparator because the comparator only compares the random number to the given threshold on a bit-wise basis.

Thereby, the data transfer within the computing system that would usually occur when subtracting the first number from the second number can also be lessened or kept to a minimum. Furthermore, this reduces the average entropy consumption of the system, since only random bits need to be generated until a decision is made, thus not needing a full set of random bits (and thus, larger entropy from the system's reservoir). This is particularly relevant when using physical random bit and number generators.

In one embodiment, in case all bits are found to be equal, it is determined that the random number and the given threshold are identical.

While the disclosed method is usually intended to separate numbers that exceed or do not exceed the given threshold from all other numbers, it can also be intended to include, in the respective determination, the case where the random number and the threshold are equal (for example either in order to discard those values or to use them further).

It can further be provided that, if the random number is found to be smaller or equal to the threshold, the random number is discarded and the comparison is repeated with a new random number. Or, if the random number is found to be larger than or equal to the threshold, the random number is discarded and the comparison is repeated with a new random number.

For numerical simulations or encryption, random numbers that exceed or that do not exceed the given threshold can be of relevance. In the further context of this description, unless otherwise stated, reference is made to random numbers that exceed the given threshold. However, the techniques can, of course, also be applied in an equal manner for the case of requiring random numbers that are below the given threshold.

In any case, by discarding the random numbers that do exceed (or do not exceed) the given threshold once this determination is made on this bit-wise comparison, the processing of a large set of random numbers can be achieved in a significantly reduced amount of time, thereby also increasing the speed of the further processing of the random numbers that exceed (or do not exceed) the threshold for example in the context of simulations or encryption.

The method can further comprise generating the random number using an algorithmic random number generator or a physical random number generator. A physical random number generator may preferably comprise a quantum random number generator. Other physical random number generators that make use of a (truly) random physical process may also be employed.

The disclosed method can be used in the context of "on the fly" random choices, for instance a binary yes or no choice, with arbitrarily large resolution on the threshold and the random number, using either already known algorithmic generators or physical random number generators. The algorithmic random number generators usually make use of an initializing value, a so-called seed (the date, the time of day or any other value) and use a computer-implemented algorithm to generate a random number. Those random numbers are, however, not true random numbers and are only pseudo-random numbers. Physical random number generators are considered to generate random numbers making use of physical processes like, for example, thermodynamic processes or quantum physical processes like interference of randomly generated laser beams using a laser driven close to or close above the lasing threshold. Other techniques or devices for physically determining a random number may also be employed, such as systems measuring of the decay of a radioactive system. These physical processes are genuinely random as they cannot be predicted and do not follow a predictable sequence of events (as would be the case when using algorithmic random number generator). Those random numbers are thus truly random and more reliable.

It can also be provided that the comparison is performed during the generating of the random number.

Thus, the comparison can be used to, for example, monitor the random number generation and determine whether the random numbers fulfill the requirements for the random numbers (for example whether they exceed or do not exceed the given threshold) before the complete random numbers are generated. This process can further be used advantageously in controlling the process of generating the random numbers, as well as in performing on-the-fly statistical tests on the random stream.

In one more specific realization, the random number is generated on a bit-wise basis, comprising generating a first bit of the random number and, after that, generating a second bit of the random number, wherein the first bit is more significant than the second bit.

Together with the performing of the comparison during the generating of the random number, this allows for a bit-wise monitoring of the random number generation where, in between the generation of the first bit and the second bit, a comparison can take place.

According to one embodiment, it can be provided that, after the first bit has been generated and before the second bit is generated, the first bit is compared to the correspondingly significant bit of the threshold.

While this results in a somewhat delayed generation of single random numbers, it can nevertheless reduce the time for generating a large number of random numbers (for example billions of random numbers), as the generation of each random number is monitored on a bit-wise basis during which it can be determined whether the requirements (for example exceeding or not exceeding the threshold) are met.

In this embodiment, if it is determined that the first bit is smaller than the correspondingly significant bit of the threshold, it is determined that the random number is smaller than the threshold and, if it is determined that the first bit is larger than the correspondingly significant bit of the threshold, it is determined that the random number is larger than the threshold.

In a more specific case, the second bit is generated if it is determined that the first bit is larger than or equal to the correspondingly significant bit of the threshold or the second bit is generated if it is determined that the first bit is smaller than or equal to the correspondingly significant bit of the threshold.

Thereby, the outcome of the comparison is directly used for controlling the further generation of the random numbers.

Moreover, in one embodiment, if it is determined that the random number will be smaller than or equal to the given threshold, the generation of the random number is aborted and a new random number is generated; or, if it is determined that the random number is larger than or equal to the given threshold, the generation of the random number is aborted and a new random number is generated.

With this, only the full random numbers that comply with the requirement (e.g., exceeding or not exceeding the threshold) are generated, thereby significantly saving computing resources for the generation of random numbers for those cases in which the requirements have already been either met or failed. In total, when considering the generation of the random numbers using physical processes, this way of monitoring and controlling the random number generation using the bit-wise comparison according to the disclosed techniques saves computing resources and at the same time reduces the time for generating the needed random numbers.

The method can further comprise using the random number, if the random number is determined to be larger than the given threshold, in at least one of encryption of data, encryption of data transmission, or a numerical simulation.

With this, the generated random numbers can be used in processes that make use of random numbers at high generation rates, such as those used in data transmission via the internet for sensitive data or numerical simulations, like physical simulations of large systems.

The computer-readable storage medium, according to the disclosed techniques, comprises computer-executable instructions that, when executed by a computer comprising a comparator, cause the computer to perform a method according to any of the preceding embodiments.

With this computer-readable storage medium, the advantages of the disclosed method can be applied to the computing systems.

The computing system according to the disclosed techniques comprises a processor, memory accessible by the processor and a comparator, wherein the computing system is adapted to execute a method according to any of the preceding embodiments.

This computing system makes use of the advantages of the disclosed method.

In this regard, it can be provided that the computing system further comprises an algorithmic or physical random number generator for generating a random number and wherein the computing system is adapted to provide a sequence of bits representing the random number to the comparator.

With this, the advantages of the disclosed method are combined with physical random number generators or algorithmic random number generators as needed.

DETAILED DESCRIPTION

Figure 1:
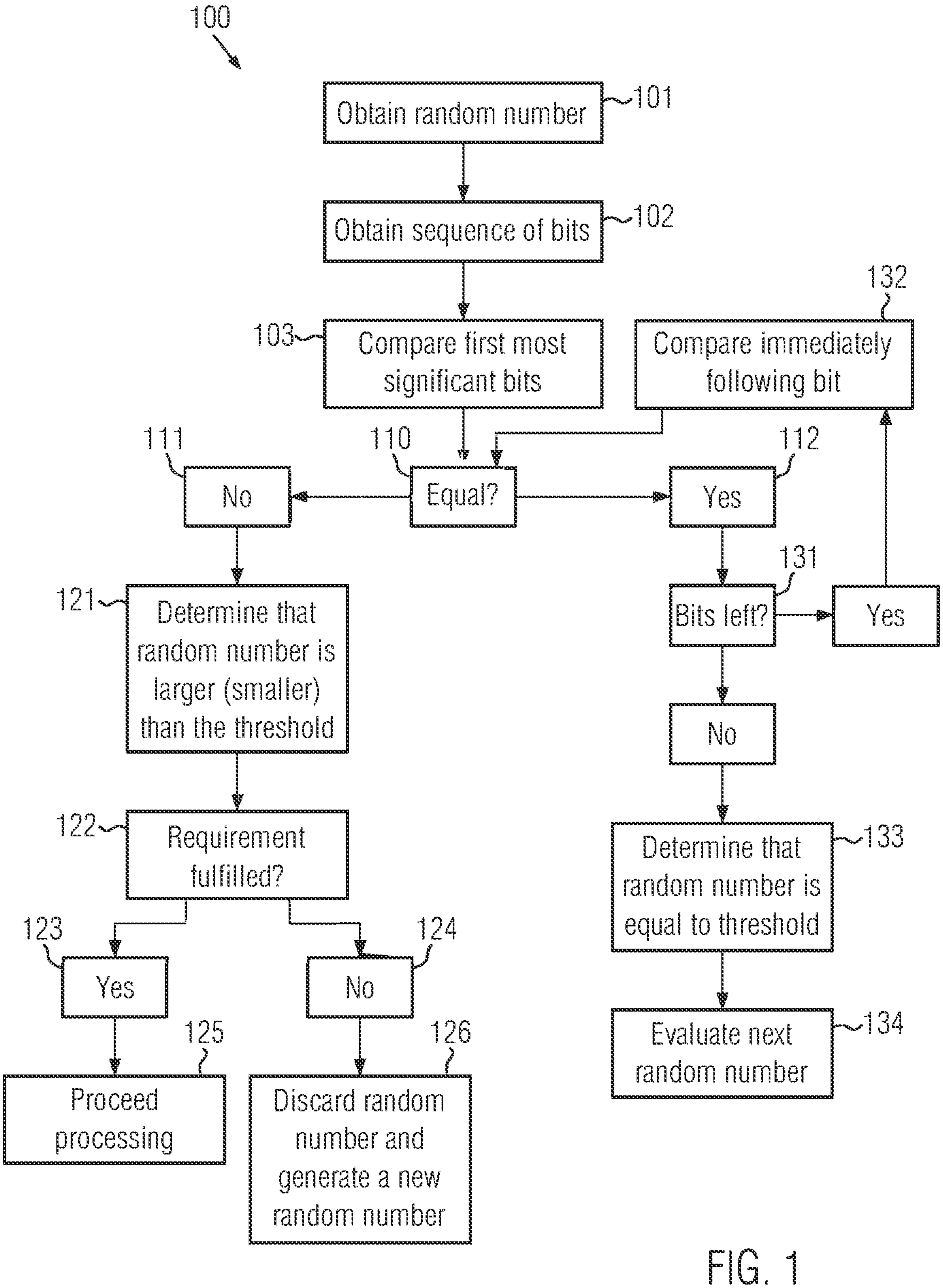
FIG. 1 Shows a schematic flow diagram of a method according to one embodiment of the disclosed techniques.

FIG. 1 shows a schematic flow diagram of the steps performed in a method 100 for deciding whether a random number is larger or smaller than a given threshold. This method may be implemented on any suitable computing system and can also be provided in an encoded form on a computer-readable storage media like a CD, a flash drive or any other suitable storage media. An example of a corresponding computing system will be provided in FIG. 3.

For the method that follows, it is assumed that a threshold value exists. This threshold may be considered a natural or real number greater than 0. It can have any value, but the method is most advantageous in the case of large numbers (in the order of $2^{128}$ in the case of 128 bit precision). The threshold value is available to the computing system applying the method, and it might be provided by a user or a computing program that makes use of the random numbers that might be the outcome of the method according to some embodiments of the disclosed techniques.

The threshold can be an arbitrary number, for example it can itself be a randomly generated number that is, however, fixed for at least one phase of the processing where at least two random numbers are utilized. It could also be thought of other realizations where the threshold value changes for each random number to be compared to the respective threshold value. The description below, however, assumes a fixed threshold value. The skilled person, can, however, easily apply the respective teachings to changing threshold values as well.

In any case, as indicated above, it is assumed that the threshold value is already available to the underlying computing system.

In this regard, the method 100 begins in step 101 with obtaining a random number. The random number can be obtained in any suitable manner. Specifically, for generating or obtaining the random number, a random number generator can be used. On the other hand, it is also possible to provide already purposely generated random numbers to the computing system that is about to perform the respective method 100. For example, previously generated random numbers (for example an amount of 1 GB of random numbers where each random number is a 128-bit long number) can be provided from an external storage medium, via data transfer techniques like wireless or cabled connections, or via the internet to the computing system for performing the method 100. If random number generators are used, the method is not limited to cases where the random number is already fully created or calculated and is then provided on a manner that it can be obtained in step 101. In fact, the method also allows for obtaining the random number in step 101 in a bit-wise manner. This is a consequence of what happens in step 102 where a sequence of bits corresponding to the random number is obtained for further use. In case the random number is provided as a humanly readable random number, i.e., not in the form of binary code, this humanly readable random number can be represented in a sequence of bits using the commonly known techniques for transforming a number into a sequence of bits. In case the random numbers are generated "on the fly" by using a random number generator, it is preferred that this generation is performed in a bit-wise manner, i.e., each bit of the random number is generated separately. In this way, it is possible to provide the random number on a bit-per-bit basis (i.e., the random number is not already fully created) in step 102.

Irrespective whether the full random number is already obtained and correspondingly a full sequence of bits is already obtained, the next steps of the method use only a single bit of the corresponding sequences of bits of the threshold and of the random number for performing a bit-wise comparison.

In step 103, the most significant bit of the random number (i.e., its representation in the form of a sequence of bits) and the most significant bit of the threshold (i.e., its representation in the form of a sequence of bits) are compared. This comparison is preferably performed by a one-bit comparator as this is most suitable and most efficient in carrying out this comparison. However, the disclosed techniques not restricted to such a one-bit comparator and any other techniques or devices for performing the comparison can be used as well.

During this comparison step 103, the comparator determines whether the first most significant bit of the random number and the first most significant bit of the threshold are equal in step 110. If it is determined in step 110 that they are not equal (as indicated in operation 111), it is determined that the random number is larger (or smaller) than the threshold in step 121.

The case where the most significant bits are not equal (i.e., step 121) can only be obtained by two circumstances. In the first circumstance, the most significant bit of the random number is 1 and the most significant bit of the threshold is 0. In this case, the random number will be, in any case and completely independent from all following bits, larger that the threshold. The other case is where the most significant bit of the random number is 0 and the most significant bit of the threshold is 1. In this case, the random number is definitely smaller than the threshold.

In the next step 122, which is optional, it can then be determined whether a specific requirement is fulfilled. For example, for the method 100 it can be intended to only process further random numbers that are larger than the threshold. This requirement will thus only be fulfilled for random numbers that are in fact determined to be larger than the threshold. Random numbers that are smaller than or equal to the threshold will not fulfill this requirement. The other way around is, of course, also possible, i.e., it can be required for example that the random numbers must be smaller than the given threshold for further processing. As indicated above, this requirement step, however, is optional and does not need to be implemented such that the method 100 could already end with step 121 where it is determined that the random number is smaller or larger than the threshold.

If, however, step 122 is provided, two decisions are possible. Either it is determined in step 123 that the requirement is fulfilled. Then the processing of the random number proceeds to step 125. Further processing of this random number can, for example, comprise using the respective number in numerical simulations or in encrypting data transfer or in encrypting data. Other techniques or processes can be implemented via stop 125 as well.

If it is determined in step 122 that the requirement is not fulfilled (i.e., step 124), the random number can be discarded in step 126 and a new random number can be obtained which will result in the method resuming with step 101. It is also possible that no new random number is obtained (because none are left, or the process is intended to end) and the method will just end.

The step 126 and also the corresponding step of ending the method can also immediately follow after step 121 without the decision-making in step 122.

Returning to the comparison in step 110 where it is determined whether the first most significant bits of the random number and the threshold are equal, another option exists. In this step 112 it can be determined for the first significant bits that they are equal. If this is determined in step 112, a decision regarding whether or not the random number is equal or not equal to the threshold cannot be made. This is because two numbers cannot be determined to be equal only based on comparing their first most significant bits. It can only be decided that they are not equal if their respective most significant bits are not equal. In that case, it is determined if there are any bits left for comparison in step 131. When the method 100 begins with the first most significant bit in step 103, this question is most likely to be answered in the affirmative because random numbers constituted by only a single bit will usually not be used with the disclosed method as the advantages become more important the longer the random numbers actually are.

However, for the sake of discussion it is assumed that this step is also included for the first most significant bits being compared to each other. If it is determined that there are bits left, the next significant bit is taken, and the respective bits of the random number and the threshold are compared to each other in step 132. This means, compared to the previous run of the method that compared the first most significant bit $r_1$ of the random number with the most significant bit $t_1$ of the threshold, now bits $r_2$ and $t_2$ are compared. Generally, after comparing bits $r_i$ and $t_i$ the next turn will compare bits $r_{i+1}$ and $t_{i+1}$.

A determination following step 110 is then made again for these bits. Once again, this can lead to the finding that these bits are equal (step 112), or that they are not equal (step 111). If they are not equal, the process following step 111 is performed. In fact, if the next significant bits are determined to not be equal, it can immediately determine that the random number is different from the threshold.

If those next significant bits are still equal (step 112) the method needs to resume with step 132 if there are bits left (step 131) and compare those bits in order to determine once again in step 110 whether those bits are equal or not.

If, in this course of action, it is determined in step 131 that no bits are left, it can be determined in step 133 that the random number is in fact equal to the threshold (if all bits of two numbers are equal, the numbers are equal).

In that case, it can be proceeded with step 134 and a new random number can be taken where optionally the random number that is considered to be equal to the threshold can be discarded.

However, depending on, for example, requirements for the further processing of the random numbers, it can also be the case that the random numbers are to be used that are not smaller than the given threshold. In such a case, random numbers that are larger or equal to the threshold would be used further (like in step 125). This branch, however, is not explicitly shown in the flow diagram of FIG. 1. In any case, the further processing after step 133 can be equal to the processing in the steps 125 or 126 if a further step corresponding to step 122 is included.

As indicated above, one of such requirements could be to use random numbers further that are at least not smaller than the threshold. However, it is also possible to discard any random number that is determined to be equal to the threshold. This can be specifically advantageous in cases where the random number is used for encryption.

As already indicated above, for the method according to FIG. 1, it is of no relevance whether the full random number is obtained in steps 101 and 102 as the comparison takes place on a bit-wise basis by, for example, the respective one-bit comparator. While this allows for methods where either the whole random number is provided and obtained (and correspondingly the whole sequence of bits), this also allows for methods where the random number or its corresponding sequence of bits is obtained on a bit-per-bit basis starting with the first most significant bit.

Where the random number is fully available (because it is pre-created for example), there is no advantage in either obtaining the full sequence of bits compared to not obtaining the full sequence of bits and only obtaining the first most significant bit of this sequence. However, in cases where the random number is not yet fully created, the method as explained with respect to FIG. 1 can advantageously be used to control the generation of the random numbers. For example, the method described in FIG. 1 could be used to generate a biased distribution of numbers from an unbiased random number generation source by only choosing those random numbers for further processing that exceed the threshold (or that do not exceed it, for example).

Figure 2:
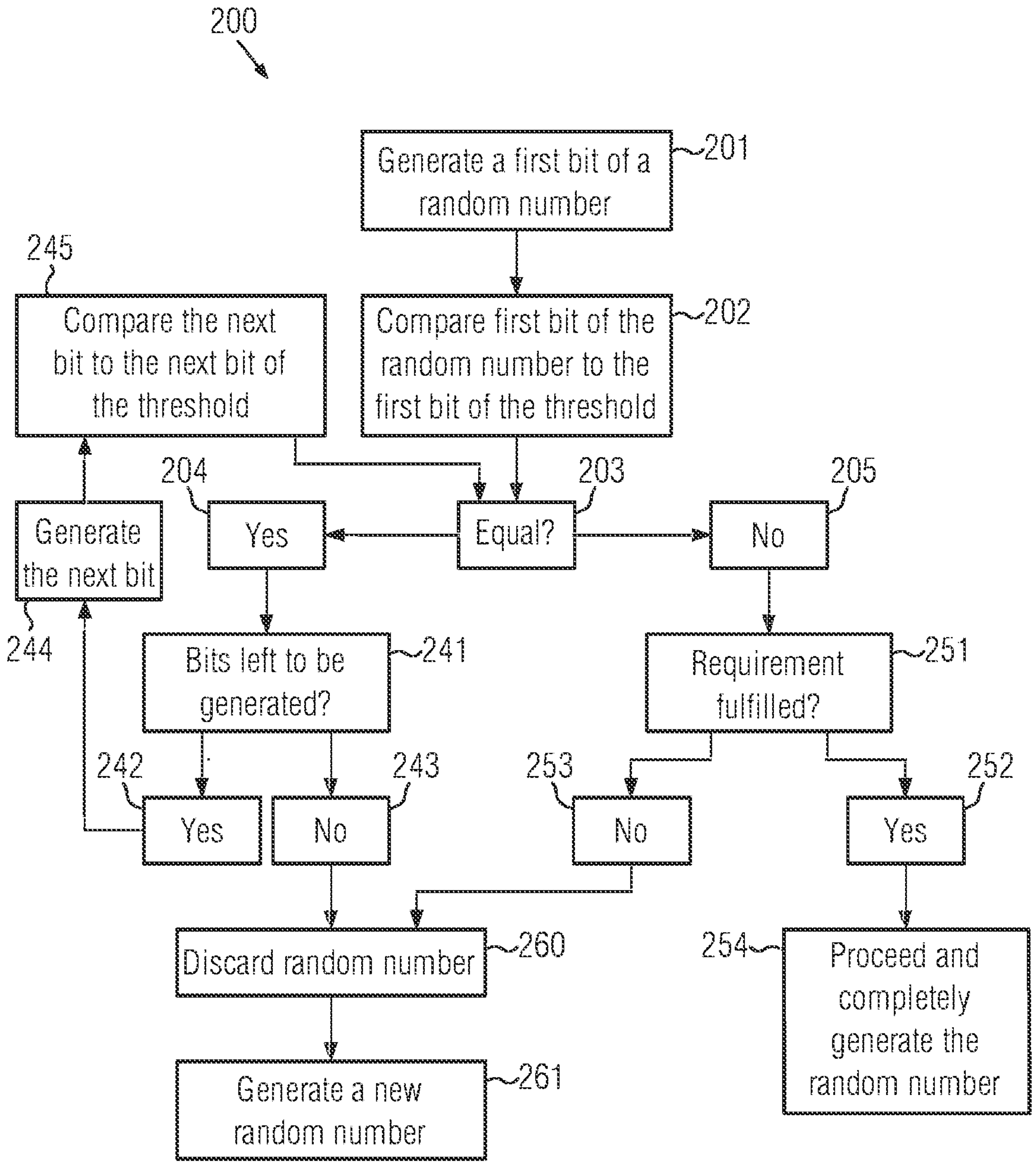
FIG. 2 Shows a further flow diagram illustrating the process flow of a method according to a further embodiment of the disclosed techniques.

In the embodiment of FIG. 2, it can be advantageous to provide each bit generated for the random number to the comparator (or other appropriate techniques) to perform the respective comparison and decide, based on the outcome of this comparison, whether or not to obtain a second bit of this random number. This will be explained in further detail with respect to FIG. 2.

In FIG. 2, the comparison is performed during the creation of the random number.

The method will ultimately begin with step 201 where the first bit of the random number is created. Once again, it will be assumed that the threshold is already fully available to the computing system carrying out the respective method. Obtaining or creating the threshold value and its respective sequence of bits will thus not be considered further here and can be done in an arbitrary manner.

The creation of the random number can be performed in any suitable way using, for example, algorithmic random number generators of physical random number generators as already explained above. The disclosed techniques are not limited in this regard. However, the respective random number generators need to be able to create the random number in the form of a sequence of bits such that it is preferably possible to stop the generation of the random number with each bit generated and to wait for the outcome of the respective comparison. This can be achieved by using random number generators that only generate values 0 and 1 in an arbitrary and random manner in sequence.

Once this first bit of the random number is generated, this first bit is considered to be the most significant bit of the random number and it is compared to the first bit (i.e., the most significant bit) of the threshold in step 202. This comparison is carried out in one of the ways as already described with respect to FIG. 1 as the process described in FIG. 1 performs a bit-wise comparison of bits of the random number and the threshold.

If it is determined in step 203 and step 205 that the first bit of the random number is not equal to the first bit of the threshold, it is (implicitly) determined that the random number that is about to be generated is different from the threshold. If this is the case, a further step as already explained with respect to FIG. 1 can be included. This step can comprise determining whether a specific requirement is fulfilled in step 251. This requirement can, for example, be that the random number that is to be generated must be larger (or smaller) than the threshold. For the further explanation, it will be assumed that the requirement is that the random number to be generated is larger than the threshold. If it is determined that this is the case (step 252, which will only be the case if the most significant bit of the random number is 1 and the most significant bit of the threshold is 0), processing proceeds with the generation of the random number in step 254. This generation of the random number can take place without using any further comparison step 202 because it is already known that the random number that is generated at the end of the method will be larger than the threshold from the comparison of the first most significant bit.

If the requirement is not fulfilled (step 253), the random number can be discarded in step 260 which means that the processing will not proceed with creating the full sequence of bits that will constitute the random number, but potentially a new random number could be generated in step 261. Generating this new random number will usually comprise simply generating a further bit with the random number generator and using this further generated bit as "first bit" in step 201 for the "new random number".

Returning to the method in step 202 and the determination whether the first bit of the random number is equal to the first bit of the threshold, another option exists. If it is determined in step 204 that those two bits are in fact equal, it is (optionally) determined in step 241 whether there are any bits left for generation. If only one bit has been created so far, it will usually be the case that further bits are to be generated. In any case, this determination in step 241 is made based on the fact that the bit length of the random number to be generated is usually already known to the system. For example, the task can be to generate a sequence of random numbers having a length of 128 bits. If only one bit has already been created, 127 bits are still to be done. If the method is already proceeded to some degree and, for example, 115 bits have already been created for a given random number, less bits will still need to be created. If all bits have been created for the respective random number, it would be determined in step 243 that no further bits are left for generation and, because it is determined in step 204 that also the last bit of the random number that is generated is equal to the threshold, the random number is equal to the threshold and the random number could be discarded. This is in line with step 260 as already explained previously.

If it is determined in step 241 with decision 242 that there are still bits left to be generated, the next bit is generated in step 244. This then generated "second" bit (or any consecutive bit) is then compared to the corresponding bit of the threshold. This means that if, for example, out of 128 bits, the bit with number 97 is just created for the random number, this bit is compared to the corresponding bit number 97 of the threshold in step 245. This comparison is performed in the way as it is performed in step 202 and correspondingly, it is determined in correspondence with step 203 whether this respective bit is equal to the bit of the threshold. Once again, decisions 204 or 205 can be made and it can thus be determined based on this second bit whether the random number is different from the threshold (for example larger or smaller).

Based on this decision, the processing either proceeds with creating bits of the random number or this "random number under generation" is discarded and the generation of a new random number can be started if it is determined, for example, that the random number that would be created when proceeding further is smaller than the threshold.

It is once again noted that this method is specifically advantageous the longer the random numbers to be generated actually are. This is basically because the decision whether or not the generated sequence of random bits represents a random number that is larger or smaller than the threshold can usually be made very fast. Indeed, in many cases this decision can already be made when having generated the first 3, 4 or 5 bits of the random number. Thus, for a 128 bit random number that is to be generated, it can already be determined after less than 5% of the amount of bits generated, whether the random number will exceed the threshold or not, thereby allowing for stopping the generation of the current random number if it does not fulfill the condition of exceeding (or not exceeding) the threshold and starting the generation of a new random number for a new decision.

Figure 3:
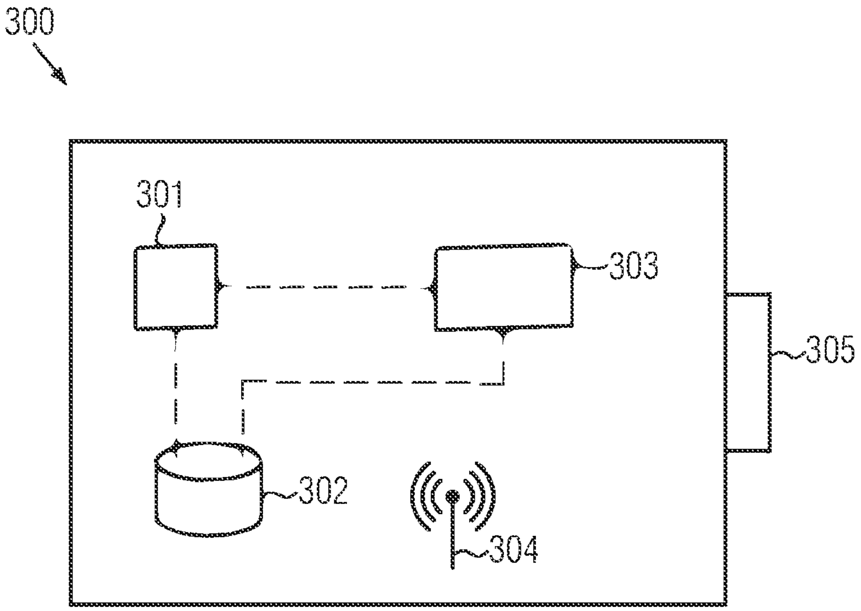
FIG. 3 Shows a schematic depiction of a computing system on which the method according to the disclosed techniques may be implemented.

FIG. 3 shows a schematic depiction of an underlying computing system 300 with a limited number of components. In this depiction, there is provided schematically a computing system like a personal computer, a server, a server farm, or any other suitable computing devices. This computing system comprises at least one processor 301 or can, of course, also comprise a plurality of processors. Furthermore, a memory 302, like a hard drive, is associated with the processor such that the processor can access data and computing programs stored on the respective memory. Additionally, a comparator 303, preferably a one-bit comparator is provided in the computing system. This can either be implemented as hardware, as software, or both.

In any case, the respective computing system 300 is adapted to perform the method according at least one embodiment as explained above. For this purpose, the memory 302 includes computer-readable instructions (program code) for performing a method, for example, in line with the embodiment described with respect to FIG. 1 or with the embodiment described with respect to FIG. 2.

Further elements of the computing system like data transfer device 304 (wireless or cabled) or interfaces 305 for attaching separate data storages can also be provided but are commonly known to the skilled person and will thus not be explained here in further detail.

As is seen from the above, the disclosed method allows for deciding whether or not a random number exceeds a specific threshold with very few operations. Though, in principle, the process described can be repeated until the last bit is determined (in case all preceding bits are equal) in order to ultimately determine whether the generated random number is equal to, larger than or smaller than the threshold, this process can also be ended or aborted earlier, for example after having generated only the most significant bit or the first 3 significant bits. Thereby, it can be ensured that the generation of full random numbers is only processed further, if it is already determined right or almost at the beginning that the random number that will be generated is definitely larger than the threshold.

In the description above, it was assumed that a single random number is generated and is to be compared against a single threshold in order to determine whether it exceeds the threshold or does not exceed the threshold. However, the disclosed techniques are not limited in this regard. For example, the disclosed techniques can also be extended to methods where there is more than one threshold against which the random number that is currently created is to be compared. The comparing of the bits of the random number against each of the thresholds can be done according to any of the previously described embodiments.

For example, there may be provided n (n being an arbitrary natural number greater than 1) thresholds where the thresholds constitute pairwise disjoint numbers. When generating the random number as explained above on a bit-wise basis, each generated bit or the generated sequence of bits constituting the random number can be compared for each bit generated against the corresponding bit or bits in each of the thresholds. By this, for each new bit, a decision (yes or no) can be made for each of the thresholds whether the to be generated random number will exceed the threshold or it will not exceed the threshold.

This ultimately allows for creating a plurality of one-bit decisions (yes or no) from the respective comparisons by only creating a single random number. For example, considering a random number of the length of 128 bits, a random number can be calculated that can reasonably be compared against billions of thresholds having different values, thereby allowing for creating billions of decision bits from the 128 bit created random number where it is also possible that it is not even necessary to create all the 128 bits of this random number as the respective decisions can usually be made after having only created a subset of those 128 bits.

Consequently, by generating just a single bit or 2 or 3 bits out of a random number that, in the end when it is finally created, will be a number of a length of 128 bits can be sufficient to already make hundreds or thousands or even more decisions.

These decisions are, in one embodiment made at least partially in parallel by comparing the bits already generated for the random number against each of the thresholds in parallel, thereby also arriving at a fast decision-making when using parallel calculations.

It is also noted that with this process of comparing the bits of the to be generated random number against the thresholds, decisions that will not result in further information can be avoided. Considering, for example, three different thresholds of arbitrary (but fixed) length, for example 128 bit, and a random number that is generated having the same length when it is finally completely generated.

Assuming that after having generated the first 2 bits of this random number, it is arrived at the decision that this random number exceeds the first and the second threshold, generating a further bit will not provide additional information that is useful for making the decision whether or not the first and second thresholds are exceeded by the to be generated random number. The full random number would thus not need to be created as no additional information in terms of whether or not the random number will exceed the first and second threshold can be obtained.

For the third threshold, it may be that the first 2 bits were not sufficient for the decision making (because the first two bits of the random number and of the third threshold are identical) and this decision can only be made after having created the third bit. Upon also having made this decision, i.e., whether the to be generated random number will exceed the third threshold or will be smaller than the third threshold, creating each successive bit will not add any information to the already made decisions.

It would thus be reasonable to abort the decision-making or at least the generation of the random number at this point because all relevant decisions (does the to be generated random number exceed the thresholds or not) are already made. This significantly saves computing resources if the further processing does not depend on the actual random number that would finally be created (i.e., its definite value) but it is only intended to make random decisions by truly random numbers.

It is clear that this process can be extended to any number of thresholds as long as the number of thresholds does not exceed the maximum value of the to be generated random number. For a random number having potentially 128 bits, it would, for example, not be reasonable to make decisions against thresholds ranging from 0 to $2^{130}$ because at least for the values exceeding $2^{128}$, this decision would always yield "no".

With the above-described method of comparing a random number against a plurality of thresholds, it is also possible to create biased random number distributions by, for example, only further processing random numbers that are within a specific interval (for example that are larger than a first threshold and smaller than a second threshold).

The invention claimed is:

1. A method comprising:

generating, at a random number generator, a random number; and outputting the random number; wherein generating the random number comprises:

representing the random number as a first sequence of bits and representing a threshold as a second sequence of bits;

comparing, by a comparator, the first sequence of bits representing the random number with the second sequence of bits representing the threshold on a bit-wise basis, wherein the comparing comprises comparing a most significant bit of the first sequence of bits representing the random number with a most significant sequence of the second sequence of bits representing the threshold, and— determining the first sequence of bits and the most significant sequence of the second sequence of bits are not equal, and deciding that the random number is larger or smaller than the threshold, or determining the first sequence of bits and the most significant sequence of the second sequence of bits are equal, repeatedly comparing an immediately following bit in the first sequence of bits representing the random number with an immediately following bit in the second sequence of bits representing the threshold until a first bit that is not equal in the first sequence of bits representing the random number and the second sequence of bits representing the threshold is reached or until all bits have been compared and found to be equal;

wherein the comparing is performed concurrently with the generation of the random number.

2. The method according to claim 1, wherein the first sequence of bits and the second sequence of bits are found to be equal and further comprising determining that the random number and the threshold are identical.

3. The method according to claim 1, wherein the random number is found to be smaller or equal to the threshold, and the random number is discarded and the comparing is repeated with a new random number.

4. The method of claim 1 wherein the random number is found to be larger than or equal to the threshold, the random number is discarded and the comparing is repeated with a new random number.

5. The method of claim 1, wherein the random number generator comprises an algorithmic random number generator or a physical random number generator.

6. The method of claim 5, wherein the random number is generated on a bit-wise basis comprising generating a first bit of the random number and, after that, generating a second bit of the random number, wherein the first bit is more significant than the second bit.

7. The method of claim 6, wherein, after the first bit has been generated and before the second bit is generated, the first bit is compared to a correspondingly significant bit of the threshold.

8. The method of claim 7, wherein it is determined that the random number is smaller than the threshold in response determining that the first bit is smaller than the correspondingly significant bit of the threshold.

9. The method of claim 7 wherein it is determined that the random number is larger than the threshold in response to determining that the first bit is larger than the correspondingly significant bit of the threshold.

10. The method of claim 7, wherein the second bit is generated if it is determined that the first bit is larger than or equal to the correspondingly significant bit of the threshold or the second bit is generated if it is determined that the first bit is smaller than or equal to the correspondingly significant bit of the threshold.

11. The method of claim 1, wherein the method further comprises determining the random number is larger than the threshold, and using the random number in at least one of encryption of data, encryption of data transmission, a numerical simulation.

12. A method comprising:

representing a random number as a first sequence of bits and representing a threshold as a second sequence of bits;

comparing, by a comparator, the first sequence of bits representing the random number with the second sequence of bits representing the threshold on a bit-wise basis, wherein the comparing comprises comparing a most significant bit of the first sequence of bits representing the random number with a most significant sequence of the second sequence of bits representing the threshold, and determining the first sequence of bits and the most significant sequence of the second sequence of bits are not equal, and deciding that the random number is larger or smaller than the threshold, or determining the first sequence of bits and the most significant sequence of the second sequence of bits are equal, repeatedly comparing an immediately following bit in the first sequence of bits representing the random number with an immediately following bit in the second sequence of bits representing the threshold until a first bit that is not equal in the first sequence of bits representing the random number and the second sequence of bits representing the threshold is reached or until all bits have been compared and found to be equal; and generating the random number using an algorithmic random number generator or a physical random number generator;

wherein the random number is generated on a bit-wise basis comprising generating a first bit of the random number and, after that, generating a second bit of the random number, wherein the first bit is more significant than the second bit;

wherein, after the first bit has been generated and before the second bit is generated, the first bit is compared to a correspondingly significant bit of the threshold;

wherein the second bit is generated if it is determined that the first bit is larger than or equal to the correspondingly significant bit of the threshold or the second bit is generated if it is determined that the first bit is smaller than or equal to the correspondingly significant bit of the threshold;

wherein it is determined that the random number will be smaller than or equal to the threshold, and the generation of the random number is aborted and a new random number is generated; or wherein it is determined that the random number will be larger than or equal to the threshold, and the generation of the random number is aborted and a new random number is generated.

13. A tangible, non-transitory computer-readable storage medium comprising computer-executable instructions that, when executed by one or more processing devices comprising a comparator, cause the one or more processing devices to:

generate, at a random number generator, a random number; and output the random number;

wherein generating the random number comprises:

represent a random number as a first sequence of bits and represent a threshold as a second sequence of bits; and comparing, by the comparator, the first sequence of bits representing the random number with the second sequence of bits representing the threshold on a bit-wise basis, wherein the comparing comprises comparing a most significant bit of the first sequence of bits representing the random number with a most significant sequence of the second sequence of bits representing the threshold, and determine the first sequence of bits and the most significant sequence of the second sequence of bits are not equal, and decide that the random number is larger or smaller than the threshold, or determine the first sequence of bits and the most significant sequence of the second sequence of bits are equal, repeatedly compare an immediately following bit in the first sequence of bits representing the random number with an immediately following bit in the second sequence of bits representing the threshold until a first bit that is not equal in the first sequence of bits representing the random number and a first sequence in the second sequence of bits representing the threshold is reached or until all bits have been compared and found to be equal, wherein the comparing is performed concurrently with the generation of the random number.

14. The tangible, non-transitory computer-readable storage medium of claim 13, wherein all bits of the first sequence of bits and the second sequence of bits are found to be equal and further comprising instructions that cause the one or more processing devices to determine that the random number and the threshold are identical.

15. The tangible, non-transitory computer-readable storage medium of claim 13, wherein the random number is found to be smaller or equal to the threshold, and the random number is discarded and the comparing-comparison is repeated with a new random number.

16. The tangible, non-transitory computer-readable storage medium of claim 13, wherein the random number is found to be larger than or equal to the threshold, the random number is discarded and the comparing is repeated with a new random number.

17. A computing system comprising a processor and a comparator, wherein the processor is configured to:

generate, at a random number generator, a random number; and output the random number;

wherein generating the random number comprises:

represent a random number as a first sequence of bits and represent a threshold as a second sequence of bits;

compare, by the comparator, the first sequence of bits representing the random number with the second sequence of bits representing the threshold on a bit-wise basis, wherein the comparing comprises comparing a most significant bit of the first sequence of bits representing the random number with a most significant sequence of the second sequence of bits representing the threshold, and determine the first sequence of bits and the most significant sequence of the second sequence of bits are not equal, and deciding that the random number is larger or smaller than the threshold, or determine the first sequence of bits and the most significant sequence of the second sequence of bits are equal, repeatedly comparing an immediately following bit in the first sequence of bits representing the random number with an immediately following bit in the second sequence of bits representing the threshold until a first bit that is not equal in the first sequence of bits representing the random number and a first sequence in the second sequence of bits representing the threshold is reached or until all bits have been compared and found to be equal, wherein the comparing is performed concurrently with the generation of the random number.

18. The computing system of claim 17, wherein all bits of the first sequence of bits and the second sequence of bits are found to be equal and further comprising instructions that cause the processor to determine that the random number and the threshold are identical.

19. The computing system of claim 17, wherein the computing system further comprises an algorithmic or physical random number generator configured to generate the random number and wherein the processor is configured to provide the first sequence of bits representing the random number to the comparator.

* * * * *